Figure 1:
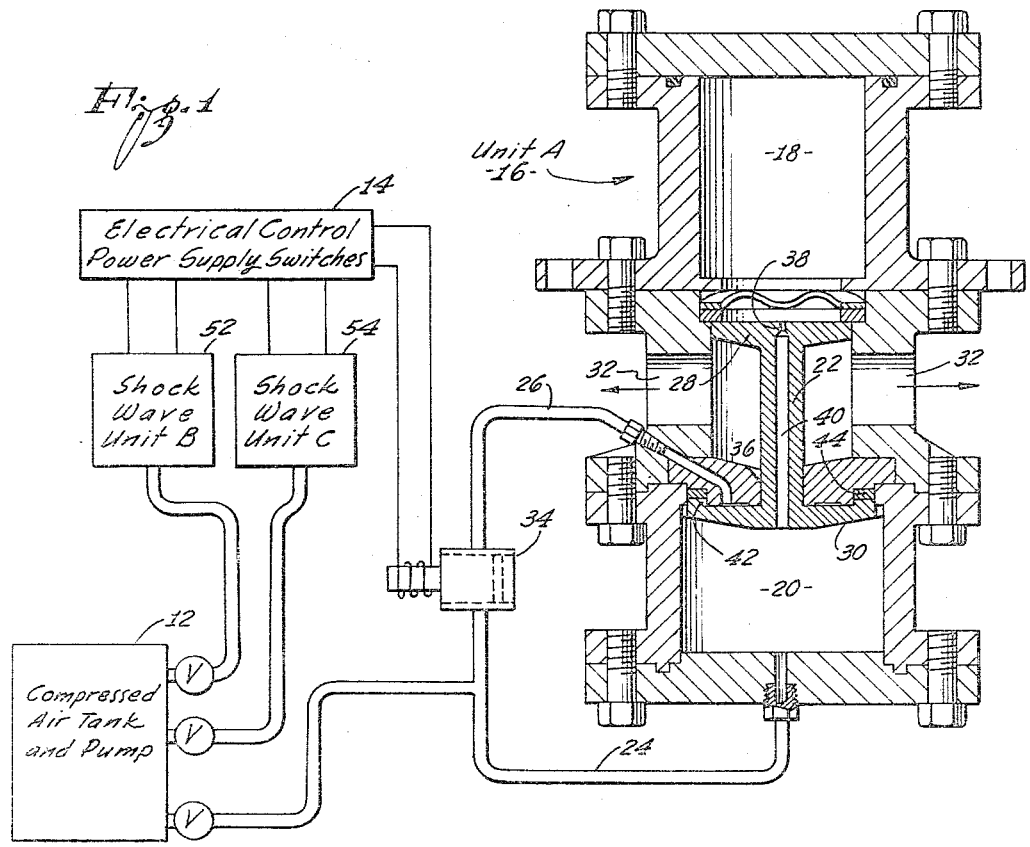

INVENTOR:
Melvin J. Wells
Alan C. Rose
Attorney

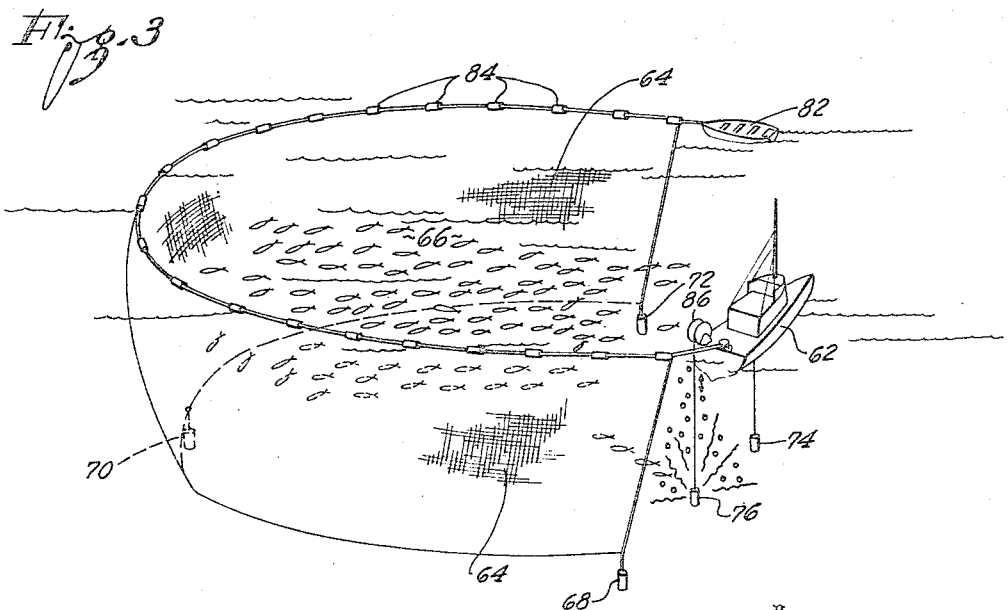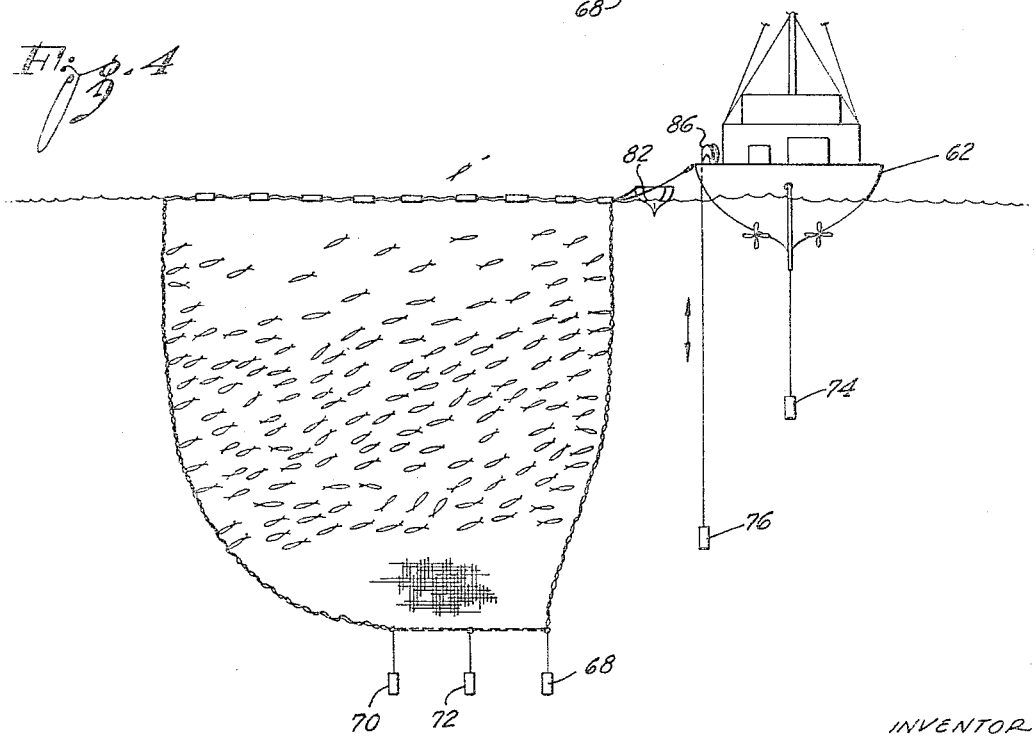

United States Patent Office 3,309,807
Patented Mar. 21, 1967

3,309,807
PNEUMATIC TECHNIQUE FOR CATCHING
OR SCARING FISH
Melvin J. Wells, Torrance, Calif., assignor to Western
Geophysical Company of America, Los Angeles, Calif.
Filed Apr. 22, 1964, Ser. No. 361,725
6 Claims. (Cl. 43—14)

This invention relates to fishing techniques, and more particularly to the use of pneumatic devices for producing sound or shock waves and bubbles as an aid to fishing and related operations.

In the course of commercial fishing operations, particularly when purse seines are employed, it is customary to encircle a school of fish with a net and bring the edges of the net together to completely entrap the fish. However, in the course of closing the net, many of the fish frequently escape under the fishing vessel just as it is closing the loop. Alternatively, prior to drawing the bottom of the purse seine together the fish may escape through the final opening. In order to prevent the escape of fish, it has previously been customary to set off small explosive charges at a critical instant during the purse seine fishing cycle. The use of the small explosive charges has not proved to be entirely satisfactory as it is difficult to cause explosions at selected depths and as quickly as required to prevent the escape of fish. In addition, the use of explosives is dangerous, expensive, and there are many restrictions on the use and transportation of explosives which have been imposed by the Coast Guard and the harbor and port authorities.

Accordingly, an important object of the present invention is to improve purse seine fishing by the use of a reliable and easily controllable apparatus for producing shock waves under the surface of the ocean.

A broad object of the invention is to control movements of marine organisms by the simultaneous pneumatic operation of a sound device and the discharge of compressed air.

In accordance with the present invention, this object has been achieved through the use of one or more pneumatic sound wave production devices to assist in controlling or netting fish. These devices preferably produce a shock wave having a very high initial pressure peak. They may be operated from the conventional compressor tanks which are used for other purposes on commercial fishing vessels. Unlike explosives, there are virtually no Coast Guard or port authority restrictions on the use of pneumatic shock wave devices; furthermore, the pneumatic devices may be energized repeatedly during the critical stage of closing the purse seine, as contrasted with the problems involved in detonating successive charges of explosive material at the desired critical time and at the proper locations during the closing of the purse seine.

Pneumatic sources have the further advantage that in producing the sound a large amount of air is released into the water over a considerable area. The air breaks up into small bubbles and rises to the surface. The resultant "bubble curtain" acts as a barrier to further restrict the escape of fish past the device.

The novel features which are believed to be characteristic of the invention, both as its organization and method of operation, together with further objects and advantages thereof, will be better understood from the following descripion considered in connection with the accompanying drawings in which an illustrative embodiment of the invention is illustrated by way of example. It is to be expressly understood, however, that the drawings are for the purpose of illustration and description only, and are not intended as a definition of the limits of the invention.

Figure 2:
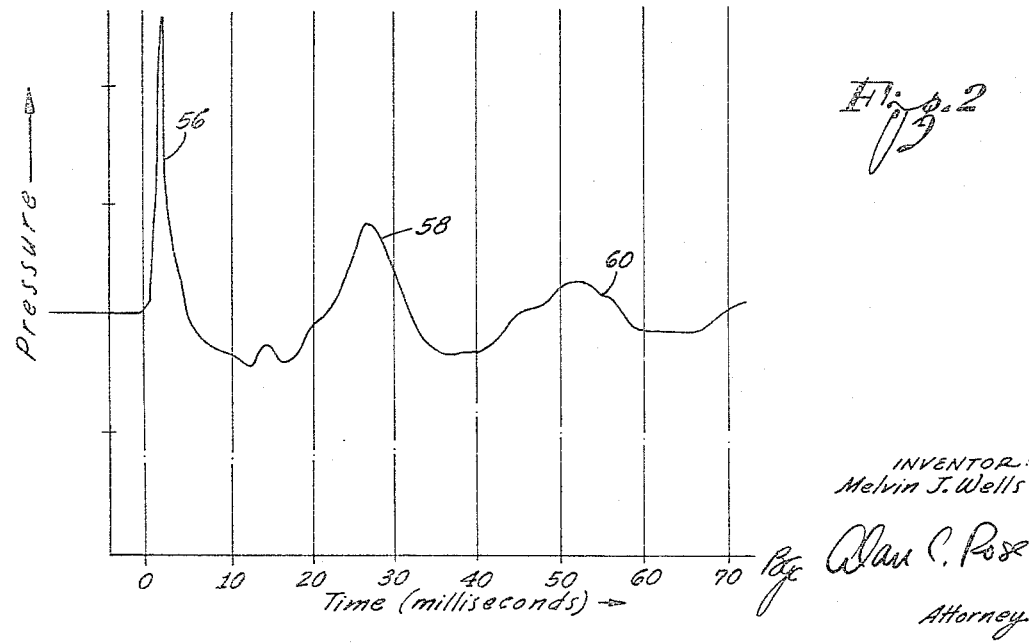

In the drawing:
FIG. 1 is a cross-sectional view of a pneumatic pressure device which may be employed in the implementation of the present invention.
FIG. 2 is a plot of pressure versus time as produced by the device of FIG. 1, and
FIGS. 3 and 4 show successive stages in the closing of a purse seine around a school of fish.

With reference to the drawings, the pneumatic device of FIG. 1 includes a source of high pressure compressed air 12, an electrical control apparatus 14 and the pneumatic impulse generator 16. The pneumatic device 16 includes upper and lower chambers 18 and 20, respectively, and a multiple piston 22. In operation, air under high pressure is supplied to the unit 16 through pneumatic tube 24 and, upon the energization of the triggering pneumatic tube 26, the piston 22 with its upper and lower heads 28 and 30, respectively, moves downward rapidly and releases a sharp pressure impulse through the ports 32 which open into the water. This impulse is produced by the sudden venting of air under high pressure from the chamber 18 into the water through the openings 32. With regard to operating details, the tube 26 is energized by the application of control signals from circuit 14 to the solenoid actuated valve 34. In addition, the outer periphery of the lower piston head 30 is scalloped to permit its rapid descent once its movement is started.

As the piston 22 descends toward the end of its stroke, its forward motion is slowed and resiliently stopped by the water entrapped in the space 36 below the openings 32. When the valve 34 is returned to its normal position, the pressure below piston face 30 is greater than that above piston 28 by virtue of the restriction 38 in the passageway 40. The piston is therefore returned to its upper position, shown in FIG. 1, with the continuous lip 42 of the lower portion 30 of the piston engaging the resilient ring 44. After the piston returns to the position shown in FIG. 1, the pressure in chamber 18 gradually builds up to the full pressure supplied by line 24 from the compressed gas source 12. The upper position is stable because the upper surface of the piston head 28 has less area than the lower area of piston head 30. The unit is then ready for reactivation when the valve 34 is open, and the downward forces on piston heads 28 and 30 exceed the upward forces.

The shock wave unit 16 is designated Unit A. A number of additional units 52 and 54, which may also be designated as Units B and C, respectively, may be energized from the source of compressed gas 12 and the electrical control circuitry 13. With this arrangement, electrical switches are provided for individually controlling Units A, B, and C and they can be fired at virtually any desired time in accordance with needs as described below.

FIG. 2 shows output pressure underwater produced by a unit such as that shown in FIG. 1. The useful and unusual feature of the pneumatic shock wave device is well illustrated by the sharp initial pulse 56 which reaches its peak within five milliseconds and which is produced as the piston descends. The characteristic shown in FIG. 2 was taken underwater with a pressure sensing device. Peaks 58 and 60 resulted from cyclic collapse and expansion of the air bubble formed in the water as a result of the original air discharge.

FIGS. 3 and 4 illustrate the use of the pneumatic pressure shock wave system of the invention for fishing. In FIG. 3 a trawler 62 is shown with its purse seine net 64 encircling a school of fish 66. At the lower edge of the net are three pneumatic pressure shock wave devices 68, 70 and 72. Two additional shock wave devices 74 and 76 are mounted directly from the trawler 62. The electrical and pneumatic connections to the shock wave devices are as indicated in FIG. 1. Thus, each shock wave device has an individual electrical control that they may be actuated upon signal from the electrical control unit within the trawler.

In purse seine fishing, the fish often escape under the boat or around the bottom edge of the net. There is usually a critical period before the purse seine net is closed when the fish are most likely to escape from the body of water enclosed by the net into the main body of ocean water. By energizing the shock wave devices deep in the water and under the boat at this critical time, the fish are scared up toward the surface of the ocean and away from the boat. Rising bubbles from the air discharge form a bubble curtain to further effectively prevent escape of the fish. This permits the fishermen to close the net without substantial loss of fish.

FIGS. 3 and 4 indicate schematically the procedure which is involved in the use of the system in accordance with the present invention. Details of purse seine fishing per se are well known in the art and are not shown or discussed in detail. In general, FIG. 3 shows a rowboat or large float 82 located at the end of the net. The upper edge of the net is supported at the surface of the water by a series of floats 84. After the traweler completes the circle, the net in closed around the school of fish by suitable ropes and cables (not shown) in accordance with well-known techniques in the fishing industry.

In the use of the pneumatic shock wave devices in fishing, it is sometimes useful to raise and lower them so that they may be actuated below the school of fish and scare them upward into the confines of the net. A reel 86, mounted on the deck of the trawler 62, may be employed to raise or lower one of the shock wave devices 76. Separate pneumatic and electrical leads may be provided to the shock wave device 76. Alternatively, a single cable with suitable electrical and pneumatic connections through the reel 86 may be employed.

The other pneumatic shock wave devices 68, 70, 72, and 74 may also be raised and lowered by lines, pulleys, and other mechanical devices; however, this will normally not be necessary in view of their locations at the periphery of the net (for devices 68, 70 and 72) and under the trawler (for unit 74). The facility for vertical positioning of the unit 76 through the use of the winch or reel 86 is most useful in preventing escape of the fish in the course of closing the net. While the other units would normally be adequate for this purpose, the presence of the vertically adjustable unit 76 completes the system and makes it virtually foolproof.

With regard to the pneumatic shock wave production system of FIG. 1, individual units are known per se. However, the present invention involves the use of one or more pneumatic shock wave devices in the catching of fish, or, more generally, in controlling the movement of marine life through the use of such devices. Accordingly, it will be appreciated that the shock wave devices may take forms other than that shown in FIG. 1. However, it is desirable that the pneumatic devices have a high initial shock wave front, or impulse, as this seems to have an unusually good effect in scaring or restraining fish from escape.

While the use of strong sound sources and particularly of devices for suddenly discharging high-pressure air into the water has been illustrated in terms of purse seine fishing, the present invention encompasses the broad concept of controlling the movement of marine life through the use of such devices. For example, the present methods may be effectively used in preventing exit of fresh water fish from stocked lakes, in preventing entry of fish into spillways or turbine intakes, or in tagging and fish census operations.

It is to be understood that the above-described arrangements are illustrative of the application of the principles of the invention. Numerous other arrangements within the scope of the invention may be devised by those skilled in the art. Thus, by way of example and not of limitation, other pneumatic shock wave producing devices may be employed; other pneumatically actuated devices to simultaneously produce a loud clanking, whistling or other sounds and also discharge bubbles into the water may be used; and pneumatic rather than electrical triggering may be used. Accordingly, from the foregoing, it is evident that various changes may be made in the present invention without departing from the spirit of the invention as defined in the appended claims.

What is claimed is:

1. In combination,
a fish net;
a high pressure gas source;
a plurality of pneumatic shock wave devices having a high pressure gas chamber and a trigger chamber, a port, and a piston normally closing said port; a supply tube connecting said high pressure gas source to said high pressure gas chamber; a triggering tube having a normally closed valve connecting said high pressure gas source and said triggering chamber;
means for supporting said devices near openings in said net; and
selective means for opening said normally closed valve to trigger said piston to a port-opening position, explosively releasing high pressure gas in said high pressure gas chamber to produce a shock pressure wave propagating through the water at high speed to prevent escape of the fish as the net is closed.

2. In combination,
a fish net;
at least one pneumatic shock wave device having a high pressure gas chamber;
means for supporting said device near an opening in said net; and
means for selectively and repeatedly and explosively releasing the gas from said gas chamber to propagate shock waves, each of said shock waves rising to an initial pressure peak within five milliseconds to prevent escape of the fish as the net is closed.

3. In combination,
a fish net;
at least one pneumatic shock wave device;
means for supporting said device near an opening in said net;
means for selectively energizing the device to explosively release high pressure gas, generating a shock wave rising to an initial pressure peak within five milliseconds to prevent escape of the fish as the net is closed; and
means for raising and lowering said device to the optimum location.

4. In combination,
means defining a first body of water having an opening connecting to a second body of water;
at least one pneumatic shock wave device;
means for supporting said device near said opening; and
means for selectively energizing the device to explosively release high pressure gas and generate a shock wave rising to an initial pressure peak within five milliseconds to prevent the passage of marine life through the opening.

5. In combination,
first and second bodies of water, one of which contains marine life;

at least one pneumatically actuated shock wave producing device having a high pressure gas chamber, said gas upon release generating a shock wave underwater, rising to an initial pressure peak within five milliseconds;

means for supporting said device between the two bodies of water; and means for selectively and repeatedly and explosively releasing said gas to prevent movement of said marine life between the first and second bodies of water.

6. In combination, a fish net;

at least one pneumatically actuated shock wave producing device having a high pressure gas chamber;

means for supporting said device near an opening in said net; and means for selectively and explosively releasing said gas to prevent escape of the fish as the net is closed to generate a shock wave propagating at high velocity and producing an initial pressure peak within five milliseconds and releasing a cloud of bubbles.

References Cited by the Examiner
UNITED STATES PATENTS

| | | | |
|---|---|---|---|
| 978,872 | 12/1910 | Freer | 43—17.1 |
| 1,464,623 | 8/1923 | Lybeck | 43—4.5 |
| 1,486,083 | 3/1924 | Freer | 43—17.1 |
| 1,980,452 | 11/1934 | Tice et al. | 43—17.1 |
| 2,860,600 | 11/1958 | Cheney | 119—3 |
| 3,005,280 | 10/1961 | Vang | 43—4.5 |
| 3,229,404 | 1/1966 | Abrahamsen et al. | 43—4.5 |

OTHER REFERENCES

Shock & Vibration Handbook, Section 44–2. Published 1961 by McGraw-Hill Book Co., Inc., New York, N.Y.

SAMUEL KOREN, *Primary Examiner.*

F. RAY CHAPPELL, *Examiner.*

W. R. CAMP, *Assistant Examiner.*